(12) United States Patent
Banki

(10) Patent No.: US 6,700,486 B1
(45) Date of Patent: Mar. 2, 2004

(54) MOTION-SENSITIVE PEST AND VARMINT DETERRENT DEVICE

(76) Inventor: David Louis Banki, P.O. Box 693, Bacliff, TX (US) 77518

( * ) Notice: Subject to any disclaimer, the term of this patent is extended or adjusted under 35 U.S.C. 154(b) by 0 days.

(21) Appl. No.: 10/080,892

(22) Filed: Feb. 22, 2002

(51) Int. Cl.[7] .................. G08B 13/00; G08B 23/00; A01K 15/02; A01K 15/04
(52) U.S. Cl. ............ 340/541; 340/573.1; 340/545.1; 119/719; 119/720
(58) Field of Search .................. 340/573.2, 573.1, 340/573.3, 541, 545.1; 119/719, 720

(56) References Cited

U.S. PATENT DOCUMENTS

| | | | |
|---|---|---|---|
| 5,009,192 A | | 4/1991 | Burman .................. 119/29 |
| 5,458,093 A | | 10/1995 | MacMillan .............. 119/720 |
| 5,501,179 A | * | 3/1996 | Cory ...................... 119/712 |
| 5,878,956 A | * | 3/1999 | Djukastein et al. ....... 239/69 |
| 5,892,446 A | * | 4/1999 | Reich .................... 340/573.1 |
| 5,966,075 A | | 10/1999 | Blanks ................. 340/573.2 |

* cited by examiner

Primary Examiner—Jeffery Hofsass
Assistant Examiner—Lam Pham
(74) Attorney, Agent, or Firm—Goldstein Law Offices, P.C.

(57) ABSTRACT

A motion-sensitive pest and varmint deterrent device used to detect and ward off unwanted pests and varmints from a garden, the device having a detection branch, and a sprinkler branch. A motion detector and a light are positioned at the top end of the detection branch. The sprinkler branch has a sprinkler head attached at the top end. The bottom end of the sprinkler branch is attached to a horizontal pipe attached to a water hose. The sprinkler branch has a solenoid valve in communication with the motion detector which selectively controls the flow of water to the sprinkler head. Reservoirs containing gardening substances are connected to and positioned along the horizontal pipe between the bottom portion of the sprinkler branch and the water hose. When movement is detected by the motion detector, the light is activated and the solenoid valve initiates water flow and the sprinkler head disperses water onto the surrounding area, thereby scaring off unwanted pests and varmints.

10 Claims, 1 Drawing Sheet

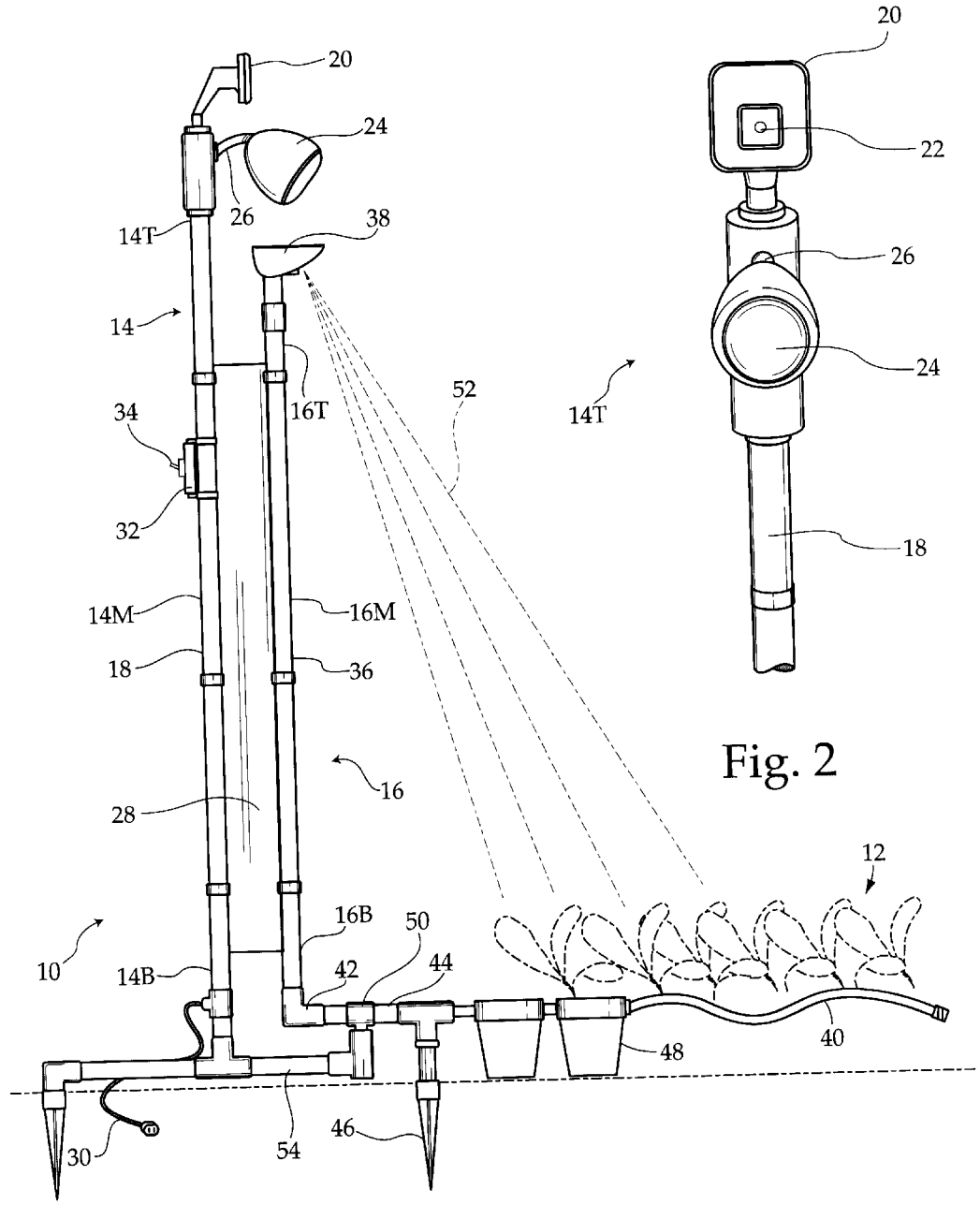
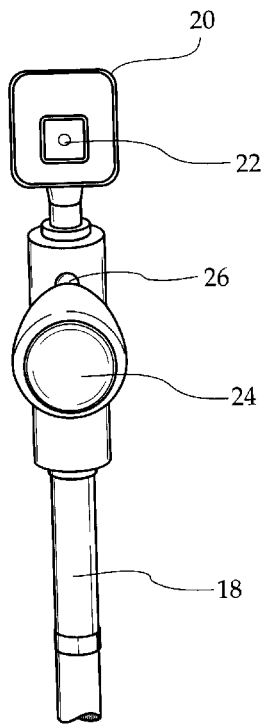
Fig. 2
Fig. 1

MOTION-SENSITIVE PEST AND VARMINT DETERRENT DEVICE

BACKGROUND OF THE INVENTION

The invention relates to a motion-sensitive pest and varmint deterrent device. In particular, the invention is a device that is placed in a garden or lawn area, said device having motion sensors to detect the presence of unwanted pests and varmints, such as animals and birds. Upon detection of motion, a sprinkler and a light are activated to frighten away the animals and birds.

People spend a lot of time, energy, and expense planting a wide variety of plant, flower, and grass seeds in their gardens and on their lawns. Unfortunately, birds often eat the seeds before they have a chance to germinate and grow, and animals eat the plants once grown. This not only causes a lot of frustration for the gardener, it also requires a person to spend more time and money replanting the garden.

Thus, there exists a need for a device which may be placed in a specific area and programmed to ward off unwanted pests and varmints. The device would have a motion sensor which would detect movement in the area, said detection triggering the deterring means.

While the units available may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved motion-sensitive pest and varmint deterrent device. As such, the general purpose of the present invention, which will be described subsequently in greater detail, is to provide a new and improved motion-sensitive pest and varmint deterrent device which has all the advantages of the prior art and none of the disadvantages.

To attain this, the present invention essentially comprises a motion-sensitive pest and varmint deterrent device used to detect and ward off unwanted pests and varmints from a garden, the device having a detection branch, a sprinkler branch, and a connector connecting the branches. The detection branch has a vertical length of piping having a top end and a bottom end. A motion detector and a light are positioned at the top end. The sprinkler branch has a vertical length of metal piping, having a top end and a bottom end, a sprinkler head attached at the top end. The bottom end of the branch is attached to an L-shaped pipe attached to a water hose. The sprinkler branch has a solenoid valve in communication with the motion detector which selectively controls the flow of water to the sprinkler head. Reservoirs containing gardening substances are connected to and positioned between the bottom portion of the sprinkler branch and the water hose. When water flow is permitted by the solenoid valve, it flows through the hose and reservoirs, through the piping, and out through the sprinkler head. When movement is detected by the motion detector, the light is activated and the solenoid valve initiates water flow and the sprinkler head disperses water onto the surrounding area, thereby scaring off unwanted animals.

It is an object of the invention to produce a motion-sensitive pest and varmint deterrent device that serves to detect movement in a garden or lawn area and ward off unwanted animals and birds. Accordingly, the device incorporates a motion sensor that triggers a light and a sprinkler to scare off pests and varmints.

It is a further object of the invention to produce a motion-sensitive pest and varmint deterrent device that waters and fertilizes gardens and lawns while keeping pests from damaging the plants and consuming seeds. Accordingly, the device has reservoirs for holding quantities of fertilizer and insecticide. The contents of the reservoirs are dispensed through the sprinkler head onto the surrounding area. Accordingly, the device can be programmed to remain on for continued irrigation, or to turn on at a predetermined time.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a side elevational view of the motion-sensitive pest and varmint deterrent device, with sprays of water and plants shown in broken lines.

FIG. 2 is a front elevational view of the top portion of the detection portion of the motion-sensitive pest and varmint deterrent device.

REFERENCE NUMERALS 10 motion-sensitive pest and varmint deterrent device
12 garden
14 detection branch
14T top end of detection branch
14B bottom end of detection branch
14M middle portion of detection branch
16 sprinkler branch
16T top end of sprinkler branch
16B bottom end of sprinkler branch
16M middle portion of sprinkler branch
18 piping of detection branch
20 motion detector
22 sensor in motion detector
24 light
26 arm
28 spacer
30 power cord
32 power box
34 switch on power box
36 metal piping of sprinkler branch
38 sprinkler head
40 water hose
42 right angle clamp
44 horizontal pipe of sprinkler branch
46 spike
48 reservoirs
50 solenoid valve
52 water
54 connector

DETAILED DESCRIPTION OF THE PREFERRED EMBODIMENTS

FIG. 1 illustrates a motion-sensitive pest and varmint deterrent device 10 used to detect and ward off unwanted pests and varmints from a garden 12 or lawn. The device 10 essentially comprises a detection branch 14 and a sprinkler branch 16, wherein the detection branch 14 and the sprinkler branch 16 are substantially parallel to each other, and are connected by an electrically insulative spacer 28.

The detection branch 14 comprises a length of piping 18, preferably PVC piping, that extends vertically to a height above the sprinkler branch 16. The detection branch 14 has a top end 14T, a bottom end 14B, and a middle portion 14M extending therebetween. A motion detector 20 and a light 24 are positioned at the top end 14T and reach over the sprinkler branch 16 in order to avoid interference therefrom. As illustrated in FIG. 2, the detector 20 incorporates sensors 22, said sensors 22 well known in the art, serving to detect any movement in the vicinity of said detector 20. The motion detector 20 is powered by electricity that is received from a power source (not shown). A power cord 30 is in communication with the bottom end 14B of the detection branch 14 and extends up the length of the branch 14 to the motion detector 20. The light 24, also receiving power through the power cord 30, is situated below the detector 20 and is attached to the detector branch 14 by an arm 26. The device 10 turns on the light 24 when movement is detected by the motion detector 20, thereby lighting up the surrounding area.

A power box 32 is attached to the detection branch 14, preferably along the middle portion 14M. The power box 32 has a switch 34 that enables a user to operate the device 10. The device 10 may be set for a variety of settings, including "Timer", "Off", "On", or "Auto". The "Timer" setting allows watering to begin at a predetermined time, and continue for a predetermined interval.

The sprinkler branch 16 comprises a vertical length of metal piping 36, having a top end 16T, a bottom end 16B, and a middle portion 16M extending therebetween. A sprinkler head 38 is attached at the top end 16T. The bottom end 16B of the branch 16A has a right angle clamp 42 that secures a horizontal pipe 44 to the vertical length of piping 36, the horizontal pipe 44 being in communication with a water hose 40. A spike 46 extends downward from the horizontal pipe 44 and is used to anchor the device 10 in place in the ground. A plurality of reservoirs 48 are connected to and positioned between the bottom portion 16T of the sprinkler branch 16 and the water hose 40, along the horizontal pipe 44. The reservoirs 48 may contain various gardening substances, namely fertilizer and insecticide. When the water 52 is turned on manually, by the timer, or triggered automatically, water flow is permitted by the solenoid valve 50 and flows through the hose 40, through the reservoirs 48, upward through the metal piping 36, and out through the sprinkler head 38.

The sprinkler branch 16 also has a solenoid valve 50 in communication with the motion detector 20. The solenoid valve 50 selectively controls the flow of water to the sprinkler head 38. The solenoid 50 is housed within a connector 54. The connector 54 is a horizontal tube that extends between the detection branch bottom end 14B and the horizontal portion 44H of the sprinkler branch L-shaped pipe 44.

The spacer 28 extends between the middle portions 14M, 16M of the detection and sprinkler branches 14, 16. The spacer 28 is electrically insulated, and serves to separate the electrical components running through the detection branch 14 from the plumbing in the sprinkler branch 16.

The piping 18, 36 of the detection branch 14 and the sprinkler branch 16 may be lengthened or shortened according to the size of the area to be monitored. A larger area would required a taller device 10, while a shorter device would suffice in a smaller area. Additional pipes may be added to the existing lengths, and attached thereby by means of fasteners.

In use, the motion-sensitive pest and varmint deterrent device 10 is placed in a garden or lawn area. The height of the device 10 is altered by adding or removing pieces of piping 18, 36 to the branches 14, 16, depending on the size of the area to be monitored. The switch 34 on the power box 32 is turned to "Auto" in order to activate the sensors 22 in the motion detector 20. When movement in the area of the device 10 is sensed, the motion detector 20 triggers the light 24, thereby flooding the area with light. The solenoid valve 50 activates the flow of water 52 through the hose 40 into the sprinkler branch 16. As the water 52 flows through the reservoirs 48, the liquid is mixed with the contents therein. The water 52 is sprayed outward from the sprinkler head 38 onto the surrounding area. Once the source of the movement leaves the area, the motion detector 20 is deactivated, thereby turning off the light 24 and the sprinkler head 38. Alternatively, the settings on the power box 32 may be set to "Timer" or "On". In these instances, water flows from the sprinkler head 38 according to the time intervals set.

In conclusion, herein is presented a motion-sensitive pest and varmint deterrent device. The invention is illustrated by example in the drawing figures, and throughout the written description. It should be understood that numerous variations are possible, while adhering to the inventive concept. Such variations are contemplated as being a part of the present invention.

What is claimed is:

1. A motion-sensitive pest and varmint deterrent device, comprising:
   a detection branch, the detection branch comprising a segmented length of piping having a distinct top end, a distinct bottom end, and a distinct middle portion extending therebetween, a motion detector with sensors positioned at the top end of the branch, and a light positioned below and activated by the motion detector, wherein the detection branch is in communication with a power source; and
   a sprinkler branch, the sprinkler branch comprising a length of piping having a top end, a bottom end and middle portion, a sprinkler head positioned at the top end, and the bottom end mateable with a water hose, said sprinkler branch having a solenoid valve which receives impulses from the motion detector in the detection branch and selectively controls water flow to the sprinkler head.

2. The motion-sensitive pest and varmint deterrent device as recited in claim 1, further comprising a plurality of reservoirs connected to the sprinkler branch, the reservoirs holding gardening substances that may be mixed with water for dispersing over the surrounding area.

3. The motion-sensitive pest and varmint deterrent device as recited in claim 2, wherein a spacer is positioned between the middle portions of the detection and sprinkler branches, the spacer being electrically insulated.

4. The motion-sensitive pest and varmint deterrent device as recited in claim 3, wherein the detection branch is longer than the sprinkler branch, thereby enabling the detection branch to sense movement without interference from the sprinkler branch.

5. The motion-sensitive pest and varmint deterrent device as recited in claim 4, wherein the bottom portion of the sprinkler branch further comprises a horizontal pipe connected thereto by a right angle clamp.

6. The motion-sensitive pest and varmint deterrent device as recited in claim 5, wherein the horizontal pipe of the sprinkler branch is connected to a water hose, the water hose being connected to the reservoirs.

7. The motion-sensitive pest and varmint deterrent device as recited in claim 5, wherein the detection branch further comprises a power box having a switch, the box having settings, wherein the user may set the power box to an "On" or "Off" setting wherein the sprinkler is turned on or off regardless of the motion detector, a "Timer" setting wherein the sprinkler is activated at a predesignated time, and an "Auto" position wherein the sprinkler is activated in response to the motion detector.

8. The motion-sensitive pest and varmint deterrent device as recited in claim 7, wherein a spike is connected to the horizontal pipe of the sprinkler branch, said spike used to anchor the device into the ground.

9. The motion-sensitive pest and varmint deterrent device as recited in claim 8, wherein the lengths of the detection branch piping and the sprinkler branch piping may be adjusted by adding or removing pieces of piping, the height being in accordance with the size of the area to be monitored.

10. A method of deterring unwanted pests and varmints from an area using a motion-sensitive animal deterrent device, the device comprising a detection branch and a sprinkler branch, the detection branch having a power cord connected to a power source, a power box having a switch, a light in connection with the power source, and the sprinkler branch having a sprinkler head at a top end, and a bottom end in connection with a water hose, and a plurality of reservoirs positioned between the branch and the hose, comprising the steps of:

positioning the device in an area to be monitored by a user;

adjusting the height of the device by adding or removing piping by the user;

anchoring the device in the ground by inserting the spike by the user;

connecting the power cord to a power source by the user;

selecting the desired operation of the device by manipulating the switch on the power box by the user;

connecting the water hose to a water supply by the user;

filling the reservoirs with gardening substances by the user;

detecting the presence of unwanted pests and varmints by sensing movement by the motion detector;

turning the light on in response to the motion detector to ward off the unwanted pest and varmints; and turning the sprinkler head on in response to the motion detector to spray the area with the water mixture.

\* \* \* \* \*